United States Patent
Li et al.

(10) Patent No.: US 10,522,887 B2
(45) Date of Patent: Dec. 31, 2019

(54) COMMUNICATION SYSTEM FOR A VEHICLE COMPRISING A DUAL CHANNEL ROTARY JOINT COUPLED TO A PLURALITY OF INTERFACE WAVEGUIDES FOR COUPLING ELECTROMAGNETIC SIGNALS BETWEEN PLURAL COMMUNICATION CHIPS

(71) Applicant: Waymo LLC, Mountain View, CA (US)

(72) Inventors: Zhe Li, San Jose, CA (US); Jamal Izadian, San Jose, CA (US); Pierre-yves Droz, Los Altos, CA (US); Min Wang, Santa Clara, CA (US)

(73) Assignee: Waymo LLC, Mountain View, CA (US)

( * ) Notice: Subject to any disclaimer, the term of this patent is extended or adjusted under 35 U.S.C. 154(b) by 0 days.

(21) Appl. No.: 15/789,533

(22) Filed: Oct. 20, 2017

(65) Prior Publication Data

US 2019/0118737 A1    Apr. 25, 2019

(51) Int. Cl.
| | |
|---|---|
| *H01P 1/06* | (2006.01) |
| *B60R 16/027* | (2006.01) |
| *H01Q 1/32* | (2006.01) |
| *H01Q 1/22* | (2006.01) |
| *H01P 3/127* | (2006.01) |
| *H01P 5/04* | (2006.01) |
| *H01P 3/12* | (2006.01) |
| *H01P 5/12* | (2006.01) |

(Continued)

(52) U.S. Cl.
CPC ............ *H01P 1/067* (2013.01); *B60R 16/027* (2013.01); *H01P 3/12* (2013.01); *H01P 3/127* (2013.01); *H01P 5/04* (2013.01); *H01P 5/12* (2013.01); *H01Q 1/2283* (2013.01); *H01Q 1/32* (2013.01); *H01Q 1/3275* (2013.01); *G05D 1/0088* (2013.01); *G05D 1/0231* (2013.01)

(58) Field of Classification Search
CPC .......... H01P 1/062; H01P 1/066; H01P 1/067; H01P 1/16; H01P 11/001; H01P 11/002
USPC .................................................. 333/256, 257
See application file for complete search history.

(56) References Cited

U.S. PATENT DOCUMENTS

| | | |
|---|---|---|
| 2,572,970 A | 10/1951 | Baker et al. |
| 2,584,399 A | 2/1952 | Preston |

(Continued)

OTHER PUBLICATIONS

Nicholson, "Microwave Rotary Joints for X-, C-, and S-Bands", Redstone Scientific Information Center, Nov. 1965.

*Primary Examiner* — Benny T Lee
(74) *Attorney, Agent, or Firm* — McDonnell Boehnen Hulbert & Berghoff LLP

(57) ABSTRACT

A vehicle having a communication system is disclosed. The system includes two electrical couplings, coupled by way of a rotary joint. Each electrical coupling includes an interface waveguide configured to couple to external signals. Each electrical coupling also includes a waveguide section configured to propagate electromagnetic signals between the interface waveguide and the rotary joint. Additionally, the rotary joint is configured to allow one electrical coupling to rotate with respect to the other electrical coupling. An axis of rotation of the rotary joint is defined by a center of a portion of the waveguides. Yet further, the rotary joint allows electromagnetic energy to propagate between the waveguides of the electrical couplings.

18 Claims, 7 Drawing Sheets

(51) Int. Cl.
  *G05D 1/02* (2006.01)
  *G05D 1/00* (2006.01)

(56) References Cited

U.S. PATENT DOCUMENTS

| | | | |
|---|---|---|---|
| 2,595,186 A | 4/1952 | Breetz | |
| 2,596,398 A | 5/1952 | Habich | |
| 2,619,539 A | 11/1952 | Fano | |
| 2,627,551 A | 2/1953 | Taylor et al. | |
| 2,633,493 A | 3/1953 | Cohn | |
| 2,641,744 A | 6/1953 | De Packh et al. | |
| 2,664,868 A | 1/1954 | Lautzenhiser | |
| 2,671,885 A | 3/1954 | Bouix | |
| 2,700,137 A | 1/1955 | Ragan | |
| 2,700,138 A | 1/1955 | Craick et al. | |
| 2,708,263 A | 5/1955 | Walters | |
| 2,713,151 A * | 7/1955 | Farr | H01P 1/067 333/137 |
| 2,737,633 A | 3/1956 | Tomiyasu | |
| 2,751,559 A | 6/1956 | McCann et al. | |
| 2,763,844 A | 9/1956 | Kruger | |
| 2,782,384 A | 2/1957 | Zaleski | |
| 2,784,383 A | 3/1957 | Zaleski | |
| 2,812,503 A | 11/1957 | Riblet et al. | |
| 2,830,276 A | 4/1958 | Zaleski | |
| 2,835,871 A | 5/1958 | Raabe | |
| 2,853,681 A | 9/1958 | Smoll | |
| 2,896,173 A | 7/1959 | Cooney | |
| 2,918,638 A | 12/1959 | Cattoi et al. | |
| 2,945,193 A | 7/1960 | Strom | |
| 2,962,677 A | 11/1960 | Edwards | |
| 2,967,280 A | 1/1961 | Fraser | |
| 2,975,382 A | 3/1961 | Fromm et al. | |
| 3,011,137 A | 11/1961 | Albanese et al. | |
| 3,016,504 A | 1/1962 | Alford et al. | |
| 3,023,382 A | 2/1962 | Borghetti | |
| 3,032,726 A | 5/1962 | Fink | |
| 3,086,181 A | 4/1963 | Lind | |
| 3,107,960 A | 10/1963 | Neher et al. | |
| 3,108,235 A | 10/1963 | Bowman | |
| 3,182,272 A | 5/1965 | Borghetti | |
| 3,189,855 A | 6/1965 | Forrer | |
| 3,668,567 A * | 6/1972 | Rosen | H01P 1/067 333/117 |
| 4,757,281 A * | 7/1988 | Anne et al. | H01P 1/067 333/117 |
| 6,489,855 B1 * | 12/2002 | Kitamori et al. | H01P 5/087 333/21 R |
| 9,979,061 B1 * | 5/2018 | Droz et al. | H01P 3/16 |
| 2013/0183902 A1 * | 7/2013 | McCarthy et al. | H04B 7/24 455/41.2 |

* cited by examiner

COMMUNICATION SYSTEM FOR A VEHICLE COMPRISING A DUAL CHANNEL ROTARY JOINT COUPLED TO A PLURALITY OF INTERFACE WAVEGUIDES FOR COUPLING ELECTROMAGNETIC SIGNALS BETWEEN PLURAL COMMUNICATION CHIPS

BACKGROUND

Unless otherwise indicated herein, the materials described in this section are not prior art to the claims in this application and are not admitted as prior art by inclusion in this section.

Vehicles can be configured to operate in an autonomous mode in which the vehicle navigates through an environment with little or no input from a driver. Such autonomous vehicles can include one or more sensors that are configured to detect information about the environment in which the vehicle operates. The vehicle and its associated computer-implemented controller use the detected information to navigate through the environment. For example, if the sensor(s) detect that the vehicle is approaching an obstacle, as determined by the computer-implemented controller, the controller adjusts the vehicle's directional controls to cause the vehicle to navigate around the obstacle.

One such sensor is a light detection and ranging (LIDAR) device. A LIDAR actively estimates distances to environmental features while scanning through a scene to assemble a cloud of point positions indicative of the three-dimensional shape of the environmental scene. Individual points are measured by generating a laser pulse and detecting a returning pulse, if any, reflected from an environmental object, and determining the distance to the reflective object according to the time delay between the emitted pulse and the reception of the reflected pulse. The laser, or set of lasers, can be rapidly and repeatedly scanned across a scene to provide continuous real-time information on distances to reflective objects in the scene. LIDAR, and other sensors, may create large amounts of data. It may be desirable to communicate this data, or a variant of this data, to various systems of the vehicle.

SUMMARY

Disclosed are electrical devices that may be used for the communication of signals to and from the various sensors of the vehicle. For example, one or more sensors may be mounted on the roof of the vehicle, such as in a sensor dome. During the operation of the sensor, the sensor may be rotated, such as by way of being mounted on a rotating platform. Although the sensor and platform are rotating, it may be desirable for the sensor to be in data communication with components on the vehicle. Therefore, it may be desirable to have a system to communicate signals between the rotating sensor and the vehicle reliably.

Some embodiments of the present disclosure provide a vehicle. The vehicle includes two electrical couplings, coupled by way of a rotary joint. Each electrical coupling includes an interface waveguide configured to couple to external signals. Each electrical coupling also includes a waveguide section configured to propagate electromagnetic signals between the interface waveguide and the rotary joint. Additionally, the rotary joint is configured to allow one electrical coupling to rotate with respect to the other electrical coupling. An axis of rotation of the rotary joint is defined by a center of a portion of the waveguide sections. Yet further, the rotary joint allows electromagnetic energy to propagate between the waveguide sections of the electrical couplings.

Some embodiments of the present disclosure provide a method. A method includes coupling an electromagnetic signal into a first interface waveguide. The method also includes coupling the electromagnetic signal from the first interface waveguide into a first waveguide section. The method further includes coupling the electromagnetic signal from the first waveguide section to a second waveguide section by way of a rotary joint. Additionally, the method includes coupling the electromagnetic signal from the second waveguide section to a second interface waveguide. Yet further, the method includes coupling the electromagnetic signal out of the second interface waveguide.

Some embodiments of the present disclosure provide a communication system. The communication system includes a rotary joint. Additionally, the communication system includes a first electrical coupling. The first electrical coupling includes a first plurality of interface waveguides configured to couple to external signals. The first electrical coupling also includes a first waveguide section configured to propagate electromagnetic signals between the first plurality of interface waveguides and the rotary joint. Additionally, the first electrical coupling includes a first septum configured to (i) launch electromagnetic signals into the first waveguide section and (ii) selectively couple electromagnetic signals from the first waveguide section into a particular interface waveguide of the first plurality of interface waveguides based on a respective mode of the electromagnetic signals such that different modes are coupled into different interface waveguides. The communication system also includes a second electrical coupling. The second electrical coupling includes a second plurality of interface waveguides configured to couple to external signals. The second electrical coupling also includes a second waveguide section configured to propagate electromagnetic signals between the second plurality of interface waveguides and the rotary joint. Additionally, the second electrical coupling includes a second septum configured to (i) launch electromagnetic signals into the second waveguide section and (ii) selectively couple electromagnetic signals from the second waveguide section into a particular interface waveguide of the second plurality of interface waveguides based on a respective mode of the electromagnetic signals from the second waveguide section such that different modes are coupled into different interface waveguides, where the rotary joint is configured to allow the first electrical coupling to rotate with respect to the second electrical coupling, wherein an axis of rotation is defined by a center of a portion of the waveguides, and where the rotary joint allows electromagnetic energy to propagate between the first waveguide section of the first electrical coupling and the second waveguide section of the second electrical coupling.

These as well as other aspects, advantages, and alternatives, will become apparent to those of ordinary skill in the art by reading the following detailed description, with reference where appropriate to the accompanying drawings.

DETAILED DESCRIPTION

I. Overview

Figure 1:
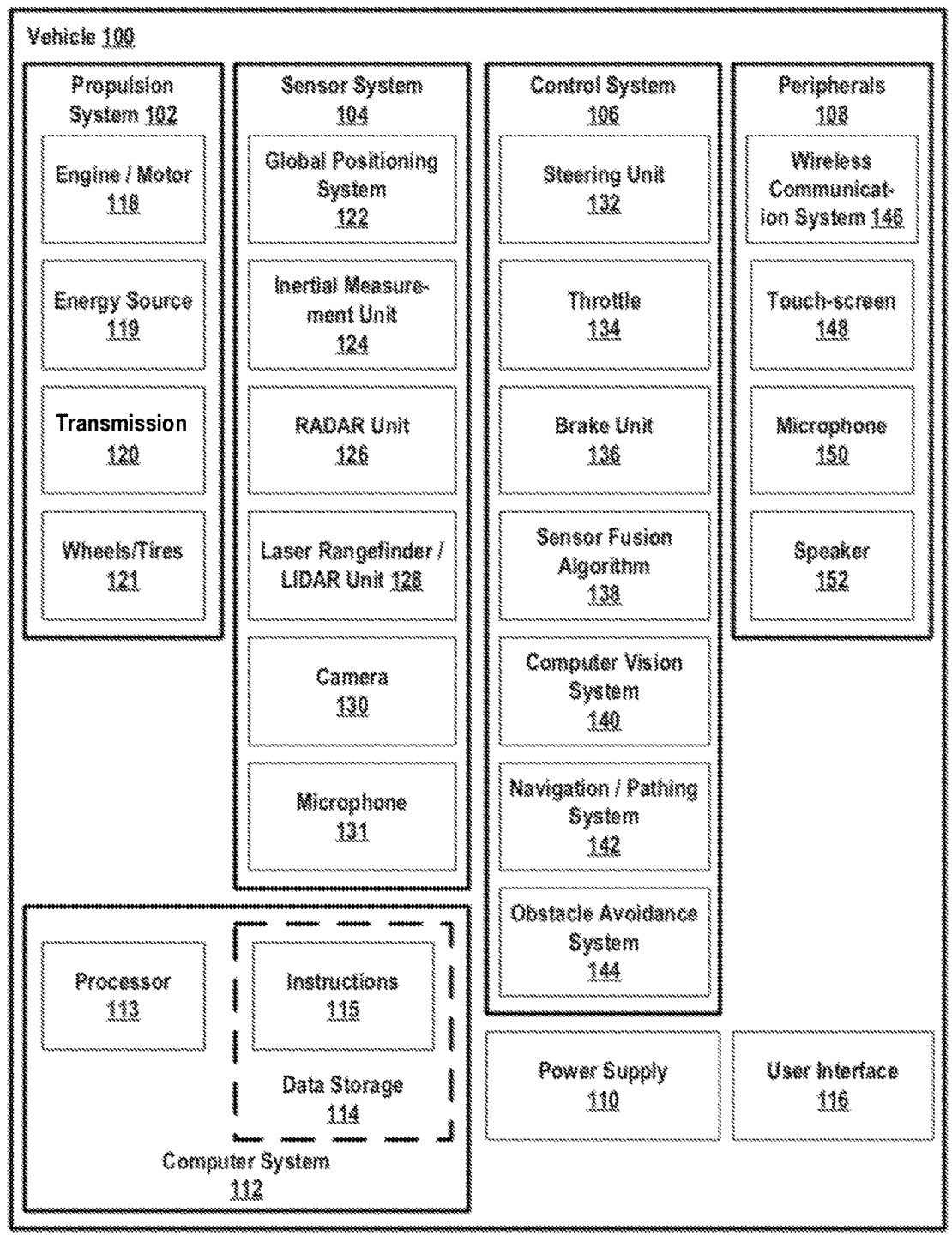
FIG. 1 is a functional block diagram depicting aspects of an example autonomous vehicle.

It can be desirable to provide communication of signals to and from the various sensors of the vehicle. For example, one or more sensors may be mounted on the roof of the vehicle. During the operation of the sensor, the sensor may be rotated (e.g., 360°) about a vertical axis, such as by way of being mounted on a rotating platform. Although the sensor and platform are rotating, it may be desirable for the sensor to be in data communication with components on the vehicle. Therefore, it may be desirable to have a system that can reliably communicate signals between the rotating sensor and the vehicle.

The rotation of the platform device may present challenges in transmitting communications to, and receiving communications from the respectively rotatable sensor. In particular, it may be undesirable to use cables to transmit communications to, and/or receive communications from the rotatable sensor, because, for example, the cables may suffer damage (e.g., due to friction) or become entangled during the rotation of the rotatable sensor.

Disclosed are contactless electrical couplings configured to transmit communications to, and receive communications from a rotatable sensor. The contactless electrical couplings may include a vehicle electrical coupling configured to be mounted on a vehicle and a sensor-side electrical coupling electrically coupled to a rotatable sensor. The contactless electrical couplings may be configured to communicate radio-frequency communications. In some examples, the radio-frequency communications may take the form of electromagnetic energy having a wavelength between 50 and 100 Gigahertz (GHz). In various other examples, the electromagnetic energy may have different frequencies.

The vehicle-side electrical coupling may include (i) at least one communication chip, (ii) at least one interface waveguide, (iii) a first septum, and (iv) a first waveguide section. Similarly, the sensor-side electrical coupling may include (i) at least one communication chip, (ii) at least one interface waveguide, (iii) a second septum, and (iv) a second waveguide section. In order to transmit communications between the two sections, the two waveguide sections may form a rotary joint.

Herein, a "rotary joint" may refer to a mechanism (or lack thereof) that enables one section of the waveguide to rotate with respect to the other section, and also enables electromagnetic energy to propagate down the length of the waveguide between the two sections, without resulting in any undesirable loss. In essence, the rotary joint electrically couples the two waveguide sections. In some examples, the rotary joint may take the form of an air gap (e.g., an air gap between respective ends of the waveguide sections equaling approximately 2 millimeters (mm)). In practice, one portion of the present waveguide system may be mounted to the vehicle while the other portion is mounted to the sensor unit. When the sensor unit is mounted the vehicle, the two portions of the waveguide may be brought proximate to each other, forming the air gap. During the operation of the sensor waveguide system, vibrations and the rotation of the sensor units may cause the spacing of the air gap and the alignment of the waveguide sections to change. The present system allows for some movement of the two waveguide sections with respect to one another, while maintaining functionality.

As another example, the rotary joint may take the form of a dielectric waveguide or other component configured to couple between two waveguide sections and support rotation of one or both sections around a vertical axis or axes. In such examples, the dielectric waveguide or other component may be configured to align the two sections (e.g., aligned such that the same vertical axis passes through the centers of both sections). However, in these and other examples, there may be scenarios in which the two sections might not be aligned. For instance, the waveguide system may reliably operate with the two centers having a misalignment up to a maximum of approximately 1 mm, or perhaps another maximum in a different implementation.

The waveguide sections may take various forms. In some embodiments, for instance, the waveguide sections may be circular waveguide sections, or another type of curved waveguide sections. In other embodiments, the waveguide sections may be square waveguide sections, rectangular waveguide sections, or another type of polygonal-shaped waveguide sections. Other waveguide section shapes are possible as well.

When the two sections are aligned, the rotation of one waveguide section with respect to the other may be rotation around a central axis of the waveguide. However, in some implementations, one section may rotate with respect to the other section without the two sections being aligned. Although the present system will be described as having a vehicle side and a sensor side, in practice, the system may be reciprocal. A reciprocal system will behave similarly when operating forward and backward. Therefore, the terms vehicle side, sensor side, transmission, and reception may be used interchangeably in various examples.

During the operation of the waveguide system, an electromagnetic signal may be created by a communication chip. The communication chip may include an integrated antenna. This antenna transmits the electromagnetic signal outside of the chip. This transmitted signal may be coupled into an interface waveguide. The interface waveguide may be designed to efficiently couple signals to and from the communication chip. The interface waveguide may be further configured to couple the electromagnetic signal into a waveguide. The waveguide may include a septum configured to launch a propagation mode in the waveguide. The propagation mode may cause the electromagnetic signal to propagate down the length of a waveguide. The waveguide may have two sections coupled by a rotary joint.

After the electromagnetic energy crosses the rotary joint, it may encounter a second septum. The second septum may cause the propagation mode to couple the electromagnetic energy into a second interface waveguide. The second interface waveguide may couple the electromagnetic energy out of the second interface waveguide into an antenna located within another communication chip. Therefore, the two communication chips may be in communication with each other by way of the rotary joint and the waveguides. The present system may have high isolation between the input ports of the various interface waveguides. In practice, if a signal is injected into first interface waveguide of the vehicle side (or the sensor side), the other interface waveguide on the same side will see none of (or a very small percentage) of the signal injected into the interface waveguide. Thus, there is a very small or non-existent signal "spillover" from one interface waveguide to the other interface waveguide on the same side of the rotary joint.

An example autonomous vehicle is described below in connection with FIGS. 1-2, while an example rotatable waveguide system is described below in connection with FIGS. 3-7.

II. Example Autonomous Vehicle System

In example embodiments, an example autonomous vehicle system may include one or more processors, one or more forms of memory, one or more input devices/interfaces, one or more output devices/interfaces, and machine-readable instructions that when executed by the one or more processors cause the system to carry out the various functions, tasks, capabilities, etc., described above.

Example systems within the scope of the present disclosure will be described in greater detail below. An example system may be implemented in, or may take the form of, an automobile. However, an example system may also be implemented in or take the form of other vehicles, such as cars, trucks, motorcycles, buses, boats, airplanes, helicopters, lawn mowers, earth movers, boats, snowmobiles, aircraft, recreational vehicles, amusement park vehicles, farm equipment, construction equipment, trams, golf carts, trains, and trolleys. Other vehicles are possible as well.

FIG. 1 is a functional block diagram illustrating a vehicle 100 according to an example embodiment. The vehicle 100 is configured to operate fully or partially in an autonomous mode, and thus may be referred to as an "autonomous vehicle." For example, a computer system 112 can control the vehicle 100 while in an autonomous mode via control instructions to a control system 106 for the vehicle 100. The computer system 112 can receive information from one or more sensor systems 104, and base one or more control processes (such as setting a heading so as to avoid a detected obstacle) upon the received information in an automated fashion.

The autonomous vehicle 100 can be fully autonomous or partially autonomous. In a partially autonomous vehicle some functions can optionally be manually controlled (e.g., by a driver) some or all of the time. Further, a partially autonomous vehicle can be configured to switch between a fully-manual operation mode and a partially-autonomous and/or a fully-autonomous operation mode.

The vehicle 100 includes a propulsion system 102, a sensor system 104, a control system 106, one or more peripherals 108, a power supply 110, a computer system 112, and a user interface 116. The vehicle 100 may include more or fewer subsystems and each subsystem can optionally include multiple components. Further, each of the subsystems and components of vehicle 100 can be interconnected and/or in communication. Thus, one or more of the functions of the vehicle 100 described herein can optionally be divided between additional functional or physical components, or combined into fewer functional or physical components. In some further examples, additional functional and/or physical components may be added to the examples illustrated by FIG. 1.

The propulsion system 102 can include components operable to provide powered motion to the vehicle 100. In some embodiments, the propulsion system 102 includes an engine/motor 118, an energy source 119, a transmission 120, and wheels/tires 121. The engine/motor 118 converts energy source 119 to mechanical energy. In some embodiments, the propulsion system 102 can optionally include one or both of engines and/or motors. For example, a gas-electric hybrid vehicle can include both a gasoline/diesel engine and an electric motor.

The energy source 119 represents a source of energy, such as electrical and/or chemical energy, that may, in full or in part, power the engine/motor 118. That is, the engine/motor 118 can be configured to convert the energy source 119 to mechanical energy to operate the transmission. In some embodiments, the energy source 119 can include gasoline, diesel, other petroleum-based fuels, propane, other compressed gas-based fuels, ethanol, solar panels, batteries, capacitors, flywheels, regenerative braking systems, and/or other sources of electrical power, etc. The energy source 119 can also provide energy for other systems of the vehicle 100.

The transmission 120 includes appropriate gears and/or mechanical elements suitable to convey the mechanical power from the engine/motor 118 to the wheels/tires 121. In some embodiments, the transmission 120 includes a gearbox, a clutch, a differential, a drive shaft, and/or axle(s), etc.

The wheels/tires 121 are arranged to stably support the vehicle 100 while providing frictional traction with a surface, such as a road, upon which the vehicle 100 moves. Accordingly, the wheels/tires 121 are configured and arranged according to the nature of the vehicle 100. For example, the wheels/tires can be arranged as a unicycle, bicycle, motorcycle, tricycle, or car/truck four-wheel format. Other wheel/tire geometries are possible, such as those including six or more wheels. Any combination of the wheels/tires 121 of vehicle 100 may be operable to rotate differentially with respect to other wheels/tires 121. The wheels/tires 121 can optionally include at least one wheel that is rigidly attached to the transmission 120 and at least one tire coupled to a rim of a corresponding wheel that makes contact with a driving surface. The wheels/tires 121 may include any combination of metal and rubber, and/or other materials or combination of materials.

The sensor system 104 generally includes one or more sensors configured to detect information about the environment surrounding the vehicle 100. For example, the sensor system 104 can include a Global Positioning System (GPS) 122, an inertial measurement unit (IMU) 124, a RADAR unit 126, a laser rangefinder/LIDAR unit 128, a camera 130, and/or a microphone 131. The sensor system 104 could also include sensors configured to monitor internal systems of the vehicle 100 (e.g., $O_2$ monitor, fuel gauge, engine oil temperature, wheel speed sensors, etc.). One or more of the sensors included in sensor system 104 could be configured to be actuated separately and/or collectively in order to modify a position and/or an orientation of the one or more sensors.

The GPS 122 is a sensor configured to estimate a geographic location of the vehicle 100. To this end, GPS 122 can include a transceiver operable to provide information regarding the position of the vehicle 100 with respect to the Earth.

The IMU 124 can include any combination of sensors (e.g., accelerometers and gyroscopes) configured to sense position and orientation changes of the vehicle 100 based on inertial acceleration.

The RADAR unit 126 can represent a system that utilizes radio signals to sense objects within the local environment of the vehicle 100. In some embodiments, in addition to sensing the objects, the RADAR unit 126 and/or the computer system 112 can additionally be configured to sense the speed and/or heading of the objects.

Similarly, the laser rangefinder or LIDAR unit 128 can be any sensor configured to sense objects in the environment in which the vehicle 100 is located using lasers. The laser rangefinder/LIDAR unit 128 can include one or more laser sources, a laser scanner, and one or more detectors, among other system components. The laser rangefinder/LIDAR unit 128 can be configured to operate in a coherent (e.g., using heterodyne detection) or an incoherent detection mode.

The camera 130 can include one or more devices configured to capture a plurality of images of the environment surrounding the vehicle 100. The camera 130 can be a still camera or a video camera. In some embodiments, the camera 130 can be mechanically movable such as by rotating and/or tilting a platform to which the camera is mounted. As such, a control process of vehicle 100 may be implemented to control the movement of camera 130.

The sensor system 104 can also include a microphone 131. The microphone 131 can be configured to capture sound from the environment surrounding vehicle 100. In some cases, multiple microphones can be arranged as a microphone array, or possibly as multiple microphone arrays.

The control system 106 is configured to control operation(s) regulating acceleration of the vehicle 100 and its components. To effect acceleration, the control system 106 includes a steering unit 132, throttle 134, brake unit 136, a sensor fusion algorithm 138, a computer vision system 140, a navigation/pathing system 142, and/or an obstacle avoidance system 144, etc.

The steering unit 132 is operable to adjust the heading of vehicle 100. For example, the steering unit can adjust the axis (or axes) of one or more of the wheels/tires 121 so as to effect turning of the vehicle. The throttle 134 is configured to control, for instance, the operating speed of the engine/motor 118 and, in turn, adjust forward acceleration of the vehicle 100 via the transmission 120 and wheels/tires 121. The brake unit 136 decelerates the vehicle 100. The brake unit 136 can use friction to slow the wheels/tires 121. In some embodiments, the brake unit 136 inductively decelerates the wheels/tires 121 by a regenerative braking process to convert kinetic energy of the wheels/tires 121 to electric current.

The sensor fusion algorithm 138 is an algorithm (or a computer program product storing an algorithm) configured to accept data from the sensor system 104 as an input. The data may include, for example, data representing information sensed at the sensors of the sensor system 104. The sensor fusion algorithm 138 can include, for example, a Kalman filter, Bayesian network, etc. The sensor fusion algorithm 138 provides assessments regarding the environment surrounding the vehicle based on the data from sensor system 104. In some embodiments, the assessments can include evaluations of individual objects and/or features in the environment surrounding vehicle 100, evaluations of particular situations, and/or evaluations of possible interference between the vehicle 100 and features in the environment (e.g., such as predicting collisions and/or impacts) based on the particular situations.

The computer vision system 140 can process and analyze images captured by camera 130 to identify objects and/or features in the environment surrounding vehicle 100. The detected features/objects can include traffic signals, roadway boundaries, other vehicles, pedestrians, and/or obstacles, etc. The computer vision system 140 can optionally employ an object recognition algorithm, a Structure From Motion (SFM) algorithm, video tracking, and/or available computer vision techniques to effect categorization and/or identification of detected features/objects. In some embodiments, the computer vision system 140 can be additionally configured to map the environment, track perceived objects, estimate the speed of objects, etc.

The navigation and pathing system 142 is configured to determine a driving path for the vehicle 100. For example, the navigation and pathing system 142 can determine a series of speeds and directional headings to effect movement of the vehicle along a path that substantially avoids perceived obstacles while generally advancing the vehicle along a roadway-based path leading to an ultimate destination, which can be set according to user inputs via the user interface 116, for example. The navigation and pathing system 142 can additionally be configured to update the driving path dynamically while the vehicle 100 is in operation on the basis of perceived obstacles, traffic patterns, weather/road conditions, etc. In some embodiments, the navigation and pathing system 142 can be configured to incorporate data from the sensor fusion algorithm 138, the GPS 122, and one or more predetermined maps so as to determine the driving path for vehicle 100.

The obstacle avoidance system 144 can represent a control system configured to identify, evaluate, and avoid or otherwise negotiate potential obstacles in the environment surrounding the vehicle 100. For example, the obstacle avoidance system 144 can effect changes in the navigation of the vehicle by operating one or more subsystems in the control system 106 to undertake swerving maneuvers, turning maneuvers, braking maneuvers, etc. In some embodiments, the obstacle avoidance system 144 is configured to automatically determine feasible ("available") obstacle avoidance maneuvers on the basis of surrounding traffic patterns, road conditions, etc. For example, the obstacle avoidance system 144 can be configured such that a swerving maneuver is not undertaken when other sensor systems detect vehicles, construction barriers, other obstacles, etc. in the region adjacent the vehicle that would be swerved into. In some embodiments, the obstacle avoidance system 144 can automatically select the maneuver that is both available and maximizes safety of occupants of the vehicle. For example, the obstacle avoidance system 144 can select an avoidance maneuver predicted to cause the least amount of acceleration in a passenger cabin of the vehicle 100.

The vehicle 100 also includes peripherals 108 configured to allow interaction between the vehicle 100 and external sensors, other vehicles, other computer systems, and/or a user, such as an occupant of the vehicle 100. For example, the peripherals 108 for receiving information from occupants, external systems, etc. can include a wireless communication system 146, a touchscreen 148, a microphone 150, and/or a speaker 152.

In some embodiments, the peripherals 108 function to receive inputs for a user of the vehicle 100 to interact with the user interface 116. To this end, the touchscreen 148 can both provide information to a user of vehicle 100, and convey information from the user indicated via the touchscreen 148 to the user interface 116. The touchscreen 148 can be configured to sense both touch positions and touch gestures from a user's finger (or stylus, etc.) via capacitive sensing, resistance sensing, optical sensing, a surface acoustic wave process, etc. The touchscreen 148 can be capable of sensing finger movement in a direction parallel or planar to the touchscreen surface, in a direction normal to the touchscreen surface, or both, and may also be capable of sensing a level of pressure applied to the touchscreen surface. An occupant of the vehicle 100 can also utilize a voice command interface. For example, the microphone 150 can be configured to receive audio (e.g., a voice command or other audio input) from a user of the vehicle 100. Similarly, the speakers 152 can be configured to output audio to the user of the vehicle 100.

In some embodiments, the peripherals 108 function to allow communication between the vehicle 100 and external systems, such as devices, sensors, other vehicles, etc. within its surrounding environment and/or controllers, servers, etc., physically located far from the vehicle that provide useful information regarding the vehicle's surroundings, such as traffic information, weather information, etc. For example, the wireless communication system 146 can wirelessly communicate with one or more devices directly or via a communication network. The wireless communication system 146 can optionally use 3G cellular communication, such as Code-Division Multiple Access (CDMA), Evolution-Data Optimized (EV-DO), Global System for Mobile communications (GSM)/General Packet Radio Surface (GPRS), and/or 4G cellular communication, such as Worldwide Interoperability for Microwave Access (WiMAX) or Long-Term Evolution (LTE). Additionally or alternatively, wireless communication system 146 can communicate with a wireless local area network (WLAN), for example, using WiFi. In some embodiments, wireless communication system 146 could communicate directly with a device, for example, using an infrared link, Bluetooth®, and/or ZigBee®. The wireless communication system 146 can include one or more dedicated short-range communication (DSRC) devices that can include public and/or private data communications between vehicles and/or roadside stations. Other wireless protocols for sending and receiving information embedded in signals, such as various vehicular communication systems, can also be employed by the wireless communication system 146 within the context of the present disclosure.

As noted above, the power supply 110 can provide power to components of vehicle 100, such as electronics in the peripherals 108, computer system 112, sensor system 104, etc. The power supply 110 can include a rechargeable lithium-ion or lead-acid battery for storing and discharging electrical energy to the various powered components, for example. In some embodiments, one or more banks of batteries can be configured to provide electrical power. In some embodiments, the power supply 110 and energy source 119 can be implemented together, as in some all-electric cars.

Many or all of the functions of vehicle 100 can be controlled via computer system 112 that receives inputs from the sensor system 104, peripherals 108, etc., and communicates appropriate control signals to the propulsion system 102, control system 106, peripherals 108, etc. to effect automatic operation of the vehicle 100 based on its surroundings. Computer system 112 includes at least one processor 113 (which can include at least one microprocessor) that executes instructions 115 stored in a non-transitory computer readable medium, such as the data storage 114. The computer system 112 may also represent a plurality of computing devices that serve to control individual components or subsystems of the vehicle 100 in a distributed fashion.

In some embodiments, data storage 114 contains instructions 115 (e.g., program logic) executable by the processor 113 to execute various functions of vehicle 100, including those described above in connection with FIG. 1. Data storage 114 may contain additional instructions as well, including instructions to transmit data to, receive data from, interact with, and/or control one or more of the propulsion system 102, the sensor system 104, the control system 106, and the peripherals 108.

In addition to the instructions 115, the data storage 114 may store data such as roadway maps, path information, among other information. Such information may be used by vehicle 100 and computer system 112 during operation of the vehicle 100 in the autonomous, semi-autonomous, and/or manual modes to select available roadways to an ultimate destination, interpret information from the sensor system 104, etc.

The vehicle 100, and associated computer system 112, provides information to and/or receives input from, a user of vehicle 100, such as an occupant in a passenger cabin of the vehicle 100. The user interface 116 can accordingly include one or more input/output devices within the set of peripherals 108, such as the wireless communication system 146, the touchscreen 148, the microphone 150, and/or the speaker 152 to allow communication between the computer system 112 and a vehicle occupant.

The computer system 112 controls the operation of the vehicle 100 based on inputs received from various subsystems indicating vehicle and/or environmental conditions (e.g., propulsion system 102, sensor system 104, and/or control system 106), as well as inputs from the user interface 116, indicating user preferences. For example, the computer system 112 can utilize input from the control system 106 to control the steering unit 132 to avoid an obstacle detected by the sensor system 104 and the obstacle avoidance system 144. The computer system 112 can be configured to control many aspects of the vehicle 100 and its subsystems. Generally, however, provisions are made for manually overriding automated controller-driven operation, such as in the event of an emergency, or merely in response to a user-activated override, etc.

The components of vehicle 100 described herein can be configured to work in an interconnected fashion with other components within or outside their respective systems. For example, the camera 130 can capture a plurality of images that represent information about an environment of the vehicle 100 while operating in an autonomous mode. The environment may include other vehicles, traffic lights, traffic signs, road markers, pedestrians, etc. The computer vision system 140 can categorize and/or recognize various aspects in the environment in concert with the sensor fusion algorithm 138, the computer system 112, etc. based on object recognition models pre-stored in data storage 114, and/or by other techniques.

Although the vehicle 100 is described and shown in FIG. 1 as having various components of vehicle 100, e.g., wireless communication system 146, computer system 112, data storage 114, and user interface 116, integrated into the vehicle 100, one or more of these components can optionally be mounted or associated separately from the vehicle 100. For example, data storage 114 can exist, in part or in full, separate from the vehicle 100, such as in a cloud-based server, for example. Thus, one or more of the functional elements of the vehicle 100 can be implemented in the form of device elements located separately or together. The functional device elements that make up vehicle 100 can generally be communicatively coupled together in a wired and/or wireless fashion.

Figure 2:
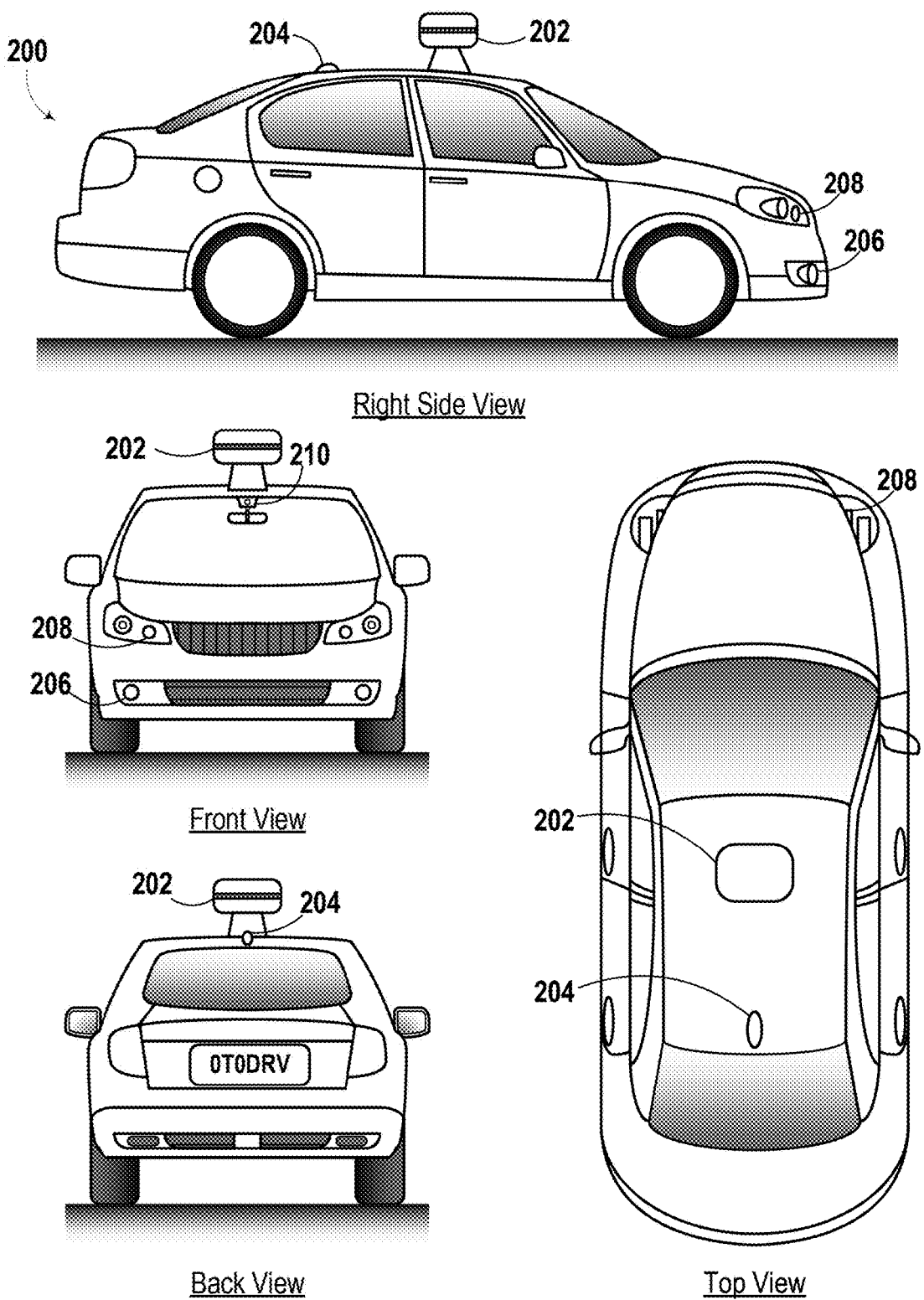
FIG. 2 depicts exterior views of an example autonomous vehicle.

FIG. 2 shows an example vehicle 200 that can include some or all of the functions described in connection with vehicle 100 in reference to FIG. 1. In particular, FIG. 2 shows various different views of vehicle 200, labeled in FIG. 2 as "Right Side View," "Front View," "Back View," and "Top View." Although vehicle 200 is illustrated in FIG. 2 as a four-wheel sedan-type car for illustrative purposes, the present disclosure is not so limited. For instance, the vehicle 200 can represent a truck, a van, a semi-trailer truck, a motorcycle, a golf cart, an off-road vehicle, or a farm vehicle, etc.

The example vehicle 200 includes a sensor unit 202, a wireless communication system 204, a RADAR unit 206, a laser rangefinder unit 208, and a camera 210. Furthermore, the example vehicle 200 can include any of the components described in connection with vehicle 100 of FIG. 1. The RADAR unit 206 and/or laser rangefinder unit 208 can actively scan the surrounding environment for the presence of potential obstacles and can be similar to the RADAR unit 126 and/or laser rangefinder/LIDAR unit 128 in the vehicle 100.

The sensor unit 202 is mounted atop the vehicle 200 and includes one or more sensors configured to detect information about an environment surrounding the vehicle 200, and output indications of the information. For example, sensor unit 202 can include any combination of cameras, RADARs, LIDARs, range finders, and acoustic sensors. The sensor unit 202 can include one or more movable mounts that could be operable to adjust the orientation of one or more sensors in the sensor unit 202. In one embodiment, the movable mount could include a rotating platform that could scan sensors so as to obtain information from each direction around the vehicle 200. In another embodiment, the movable mount of the sensor unit 202 could be moveable in a scanning fashion within a particular range of angles and/or azimuths. The sensor unit 202 could be mounted atop the roof of a car, for instance, however other mounting locations are possible. Additionally, the sensors of sensor unit 202 could be distributed in different locations and need not be collocated in a single location. Some possible sensor types and mounting locations include RADAR unit 206 and laser rangefinder unit 208. Furthermore, each sensor of sensor unit 202 can be configured to be moved or scanned independently of other sensors of sensor unit 202.

In an example configuration, one or more RADAR scanners (e.g., the RADAR unit 206) can be located near the front of the vehicle 200, to actively scan the region in front of the car 200 for the presence of radio-reflective objects. A RADAR scanner can be situated, for example, in a location suitable to illuminate a region including a forward-moving path of the vehicle 200 without occlusion by other features of the vehicle 200. For example, a RADAR scanner can be situated to be embedded and/or mounted in or near the front bumper, front headlights, cowl, and/or hood, etc. Furthermore, one or more additional RADAR scanning devices can be located to actively scan the side and/or rear of the vehicle 200 for the presence of radio-reflective objects, such as by including such devices in or near the rear bumper, side panels, rocker panels, and/or undercarriage, etc.

The wireless communication system 204 could be located on a roof of the vehicle 200 as depicted in FIG. 2. Alternatively, the wireless communication system 204 could be located, fully or in part, elsewhere. The wireless communication system 204 may include wireless transmitters and receivers that could be configured to communicate with devices external or internal to the vehicle 200. Specifically, the wireless communication system 204 could include transceivers configured to communicate with other vehicles and/or computing devices, for instance, in a vehicular communication system or a roadway station. Examples of such vehicular communication systems include dedicated short-range communications (DSRC), radio frequency identification (RFID), and other proposed communication standards directed towards intelligent transport systems.

The camera 210 can be a photo-sensitive instrument, such as a still camera, a video camera, etc., that is configured to capture a plurality of images of the environment of the vehicle 200. To this end, the camera 210 can be configured to detect visible light, and can additionally or alternatively be configured to detect light from other portions of the spectrum, such as infrared or ultraviolet light. The camera 210 can be a two-dimensional detector, and can optionally have a three-dimensional spatial range of sensitivity. In some embodiments, the camera 210 can include, for example, a range detector configured to generate a two-dimensional image indicating distance from the camera 210 to a number of points in the environment. To this end, the camera 210 may use one or more range detecting techniques.

For example, the camera 210 can provide range information by using a structured light technique in which the vehicle 200 illuminates an object in the environment with a predetermined light pattern, such as a grid or checkerboard pattern and uses the camera 210 to detect a reflection of the predetermined light pattern from environmental surroundings. Based on distortions in the reflected light pattern, the vehicle 200 can determine the distance to the points on the object. The predetermined light pattern may comprise infrared light, or radiation at other suitable wavelengths for such measurements.

The camera 210 can be mounted inside a front windshield of the vehicle 200. Specifically, the camera 210 can be situated to capture images from a forward-looking view with respect to the orientation of the vehicle 200. Other mounting locations and viewing angles of camera 210 can also be used, either inside or outside the vehicle 200. Further, the camera 210 can have associated optics operable to provide an adjustable field of view. Still further, the camera 210 can be mounted to vehicle 200 with a movable mount to vary a pointing angle of the camera 210, such as via a pan/tilt mechanism.

III. Example Communication System

In some cases, the sensor unit 202 described above in connection with FIG. 2 may include a variety of sensors, such as LIDAR, RADAR, other optical sensors, and/or other sensors. During the operation of the sensors, it may be desirable to communicate a large amount of data between the sensor unit and various systems of the vehicle.

The sensor unit may include a rotatable set of sensors that is configured to rotate (e.g., 360°) about a vertical axis. Further, the rotatable sensor device may include contactless electrical couplings configured to transmit communications to, and receive communications from the rotatable sensor unit. For example, the communications may be data sent to or received from the sensor unit.

Figure 3:
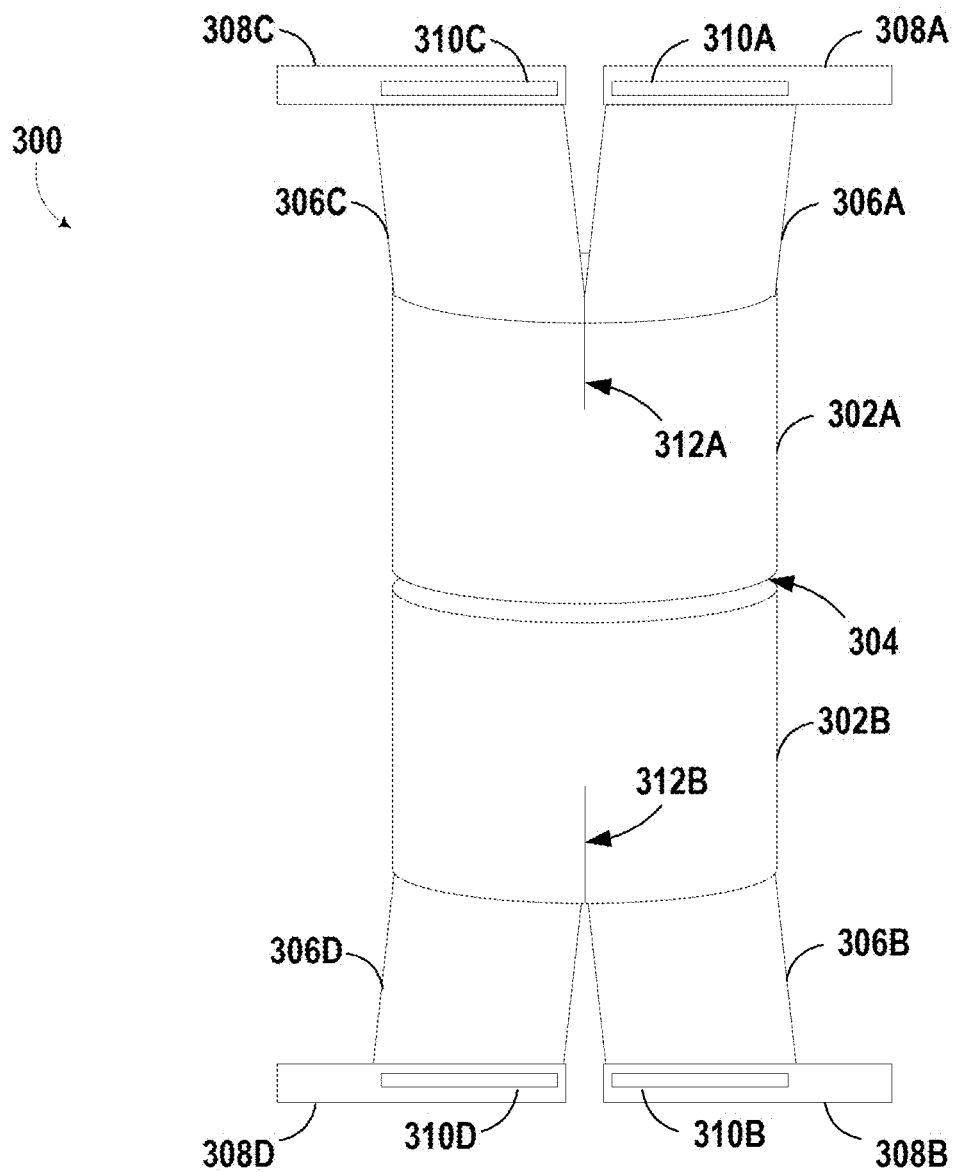
FIG. 3 illustrates an example waveguide system.

FIG. 3 illustrates an example waveguide system 300 that forms the contactless electrical coupling. Example waveguide system 300 includes circular waveguide sections as representative waveguide sections, although, as noted above, other types and shapes of waveguide sections are possible in other waveguide systems. In particular, the waveguide system 300 includes a first circular waveguide section 302A and a second circular waveguide section 302B. The first circular waveguide section 302A and the second circular waveguide section 302B may be electrically coupled by way of rotary joint 304. At the rotary joint 304, the first circular waveguide section 302A and the second circular waveguide section 302B may be approximately aligned based on the center axis of the circular portion of the waveguide.

The waveguides that form system 300 may be constructed of a metallic material, a non-metallic material that has been plated with a metallic surface, a dielectric material, a combination of these materials, or other materials that may have electromagnetic properties to contain and allow the propagation of electromagnetic signals.

In various embodiments, the rotary joint 304 may take various forms. As shown in the figures, the rotary joint 304 may be an air gap. For example, the first circular waveguide section 302A and the second circular waveguide section 302B may be separated by an air gap on the order of 1-3 millimeter (mm) when the electromagnetic energy is between 50 and 100 GHz. The air gap does not have to be between 1 mm and 3 mm. In some examples, the air gap may be bigger or smaller. In practice, one portion of the present waveguide system may be mounted to the vehicle while the other portion is mounted to the sensor unit. When the sensor unit is mounted the vehicle, the two portions of the waveguide may be brought proximate to each other, forming the air gap. During the operation of the waveguide system, vibrations and the rotation of the sensor units may cause the spacing of the air gap and the alignment of the waveguide sections to change.

As previously discussed with respect to other examples, the rotary joint 304 may include a physical connection between the first circular waveguide section 302A and the second circular waveguide section 302B. The physical connection may be an abutment of the ends of the first circular waveguide section 302A and the second circular waveguide section 302B. In some additional examples, the rotary joint 304 may include other components as well. For example, the rotary joint 304 may include some additional components, such as a bearing sleeve, slip ring, or similar structure, that help align the first circular waveguide section 302A and the second circular waveguide section 302B while allowing for rotation.

The first circular waveguide section 302A may be coupled to a plurality of interface waveguides, shown as interface waveguide 306A and 306C. The second circular waveguide section 302B may also be coupled to a plurality of interface waveguides, shown as interface waveguide 306B and 306D.

Each interface waveguide may be coupled to a communication chip having a chip antenna. For example, interface waveguide 306A is coupled to communication chip 308A by way of chip antenna 310A, interface waveguide 306B is coupled to communication chip 308B by way of chip antenna 310B, interface waveguide 306C is coupled to communication chip 308C by way of chip antenna 310C, and interface waveguide 306D is coupled to communication chip 308D by way of chip antenna 310D. In some examples, a single communication chip may have multiple antenna and therefore a single chip may be coupled to multiple interface waveguide (as shown with respect to FIG. 6).

The first circular waveguide section 302A may include a septum 312A and the second circular waveguide section 302B may include a septum 312B. Each septum may be aligned in a vertical manner on a plane defined by a center of where the interface waveguides couple to the circular waveguide. Essentially, the septums may form a wall in the circular waveguide between the openings of the interface waveguides.

As so arranged, example waveguide system 300 may in some implementations operate such that communication chips 308A and 308C may communicate with communication chips 308D and 308D by way of the interface waveguides and circular waveguide sections. For example, communication chip 308A may transmit a signal via antenna 310A, and communication chip 308C may transmit a signal via antenna 310C. The signal from chip 308A may be coupled into and propagate through interface waveguide 306A, and the signal from chip 308C may be coupled into and propagate through interface waveguide 308C. Each of these interface waveguides may in turn efficiently couple the two signals into circular waveguide section 302A.

In line with the discussion above, septum 312A may cause each of the two signals to have orthogonal modes, after which the two signals may propagate down the length of the circular waveguide, past the rotary joint, to septum 312B. The two signals having orthogonal modes at this point may enable septum 312B to split the signals, and, in turn, couple one to interface waveguide 306B, and couple the other to interface waveguide 306D. The signals may then propagate through the respective interface waveguides to be coupled into the communication chips 308B and 308D, which receives the signals via antennas 310B and 310D, respectively.

Figure 4A:
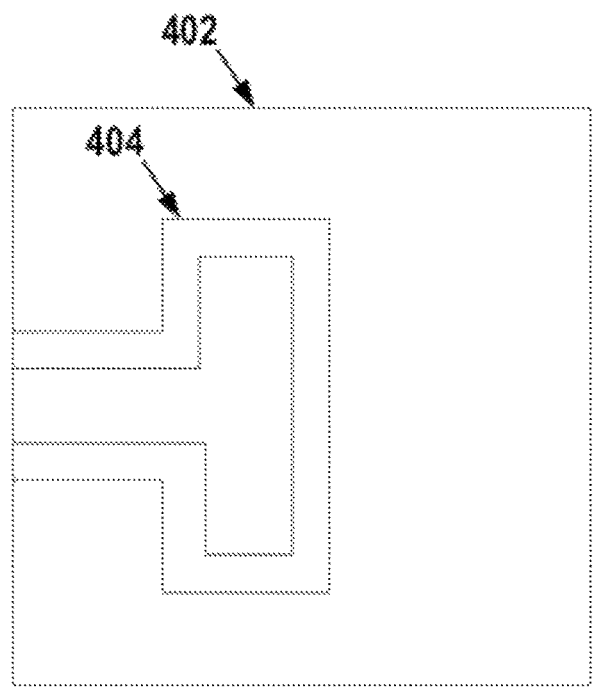
FIG. 4A illustrates an example microchip having an antenna.

FIG. 4A illustrates an example microchip 402 having an antenna 404. The antenna 404 may be used by the microchip 402 to communicate signals out of and into the microchip 402. Often, and especially at radio frequencies, the interface to and from a microchip may be inefficient and or difficult to design. Therefore, to improve chip communications, microchips may include antennas that can communicate signals to components external to the microchip.

In conventional systems, an external component may have an antenna that receives the signal output by the antenna of the microchip (or the external antenna can transmit a signal to be received by the antenna of the microchip). The present system uses a waveguide to directly harvest the electromagnetic energy transmitted by the antenna of the microchip. By using a waveguide to harvest the energy, the system may be able to communicate signals from the microchip to other various components in an efficient manner.

Figure 4B:
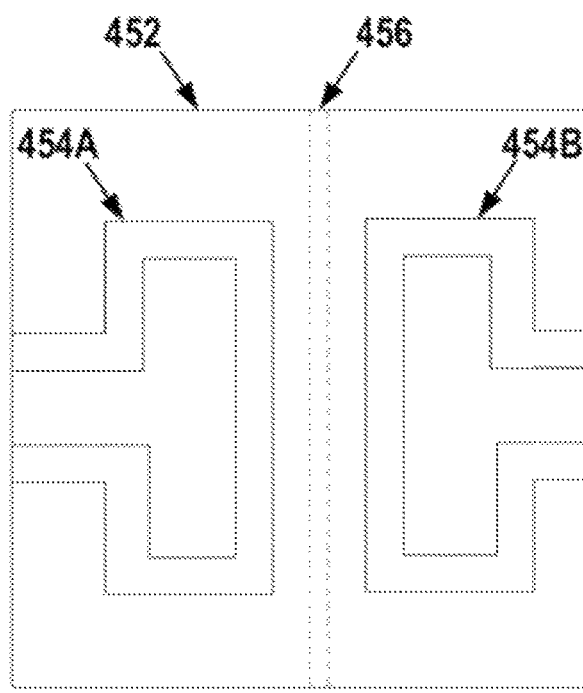
FIG. 4B illustrates an example microchip having two antennas.

FIG. 4B illustrates an example microchip 452 having two antennas 454A and 454B. The example microchip 452 also includes a grounding portion 456 locate between the two antennas 454A and 454B. Microchip 452 may include two (or more) antennas, each of which functions in a similar manner to the antennas of microchip 402. Each antenna of microchip 452 may be coupled to a respective interface waveguide. In addition, microchip 452 may have a grounding portion 456. The grounding portion 456 may be coupled to the waveguide structure disclosed herein. By grounding the grounding portion 456 to the waveguide structure, the two antennas may be sufficiently isolated from each other. When the two antennas are isolated from each other, each antenna might not receive (or recieve a small portion of) signals communicated to or from the other respective antenna.

Figure 5:
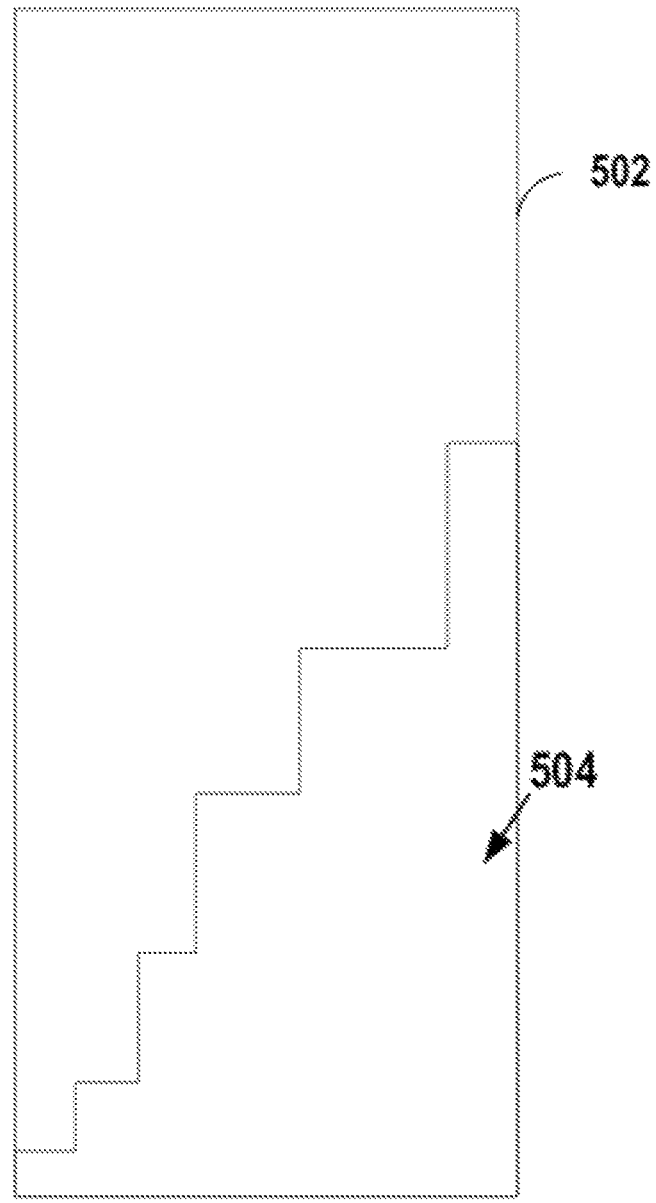
FIG. 5 illustrates an example septum of a waveguide.

FIG. 5 illustrates an example septum 504 of a waveguide 502. As shown, the septum may have a stepped pattern. The septum 504 may be constructed of a metallic material, a non-metallic material that has been plated with a metallic surface, a dielectric material, a combination of these materials, or other materials that may have electromagnetic properties to alter electromagnetic signals. The stepped pattern may cause a signal that begins propagation on one side of the septum to have an orthogonal mode to a signal that begins propagation on the other side of the septum. Similarly, the stepped pattern may be able to split electromagnetic energy based on the modes contained in the energy. The stepped pattern may cause a portion signal that has a first mode to continue propagation on one side of the septum and may cause a portion signal that has a second mode to continue propagation on the other side of the septum.

Through the use of the septum separating the propagation modes, two chips who are in communication with each other by way of the present waveguide structure may remain in communication irrespective of the rotation of the waveguides. Therefore, signals sent by an antenna of one chip may be able to be received by the corresponding chip throughout the entire rotation. Although the present septum is shown having the stepped pattern, other shapes may be used as well. In some examples, or where orthogonality is not desired, the septum may be omitted.

Figure 6:
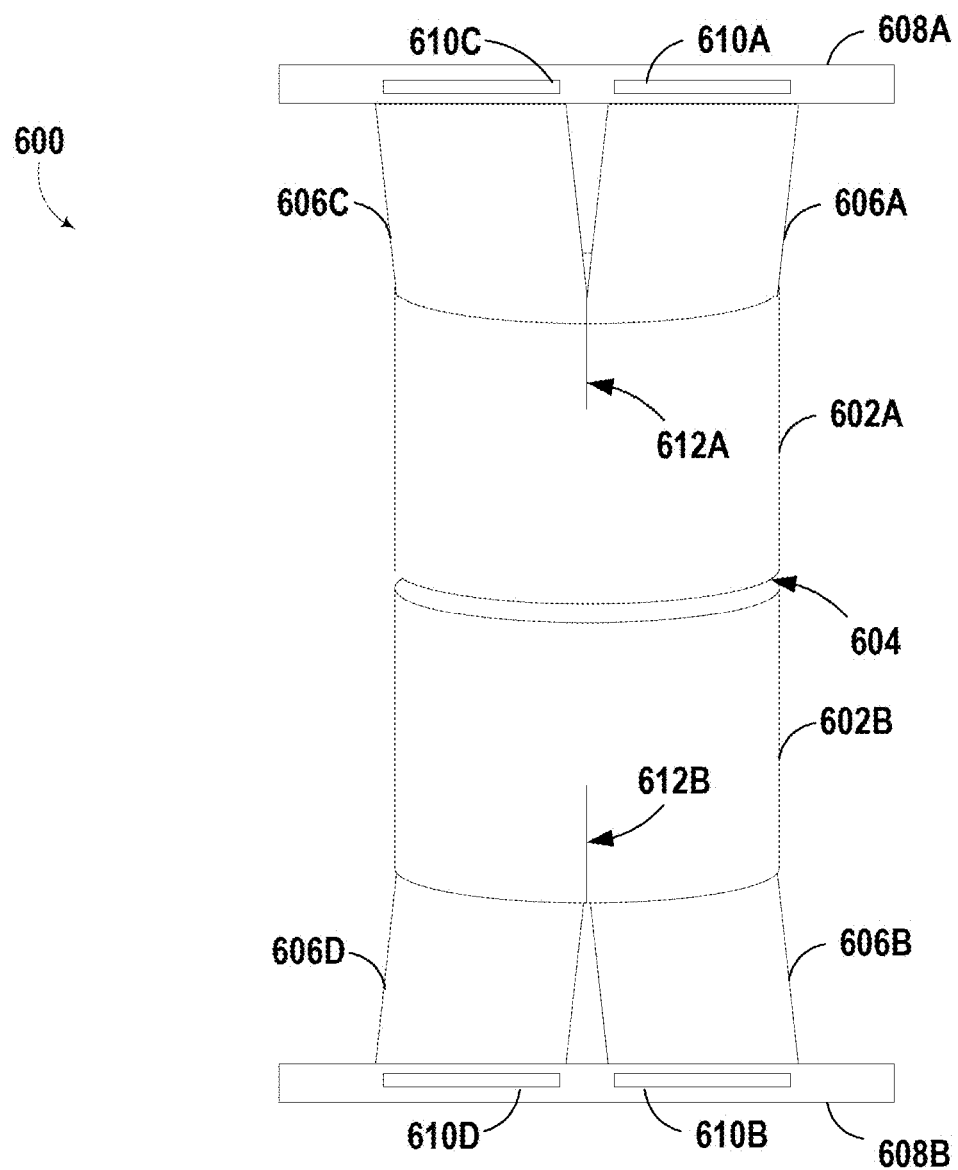
FIG. 6 illustrates another example waveguide system.

FIG. 6 illustrates another example waveguide system 600 that forms the contactless electrical coupling. The waveguide system 600 includes a first circular waveguide section 602A and a second circular waveguide section 602B. The first circular waveguide section 602A and the second circular waveguide section 602B may be electrically coupled by way of rotary joint 604.

The first circular waveguide section 602A may be coupled to a plurality of interface waveguides, shown as interface waveguides 606A and 606C. The second circular waveguide section 602B may also be coupled to a plurality of interface waveguides, shown as interface waveguide 606B and 606D.

Each interface waveguide may be coupled to a communication chip having a chip antenna. For example, interface waveguide 606A is coupled to communication chip 608A by way of chip antenna 610A, interface waveguide 606C is coupled to communication chip 608A by way of chip antenna 610C, interface waveguide 606B is coupled to communication chip 608B by way of chip antenna 610B, and interface waveguide 606D is coupled to communication chip 608B by way of chip antenna 610D. The first circular waveguide section 602A may include a septum 612A and the second circular waveguide section 602B may include a septum 612B.

As so arranged, example waveguide system 600 may operate similarly to example waveguide system 300 described above (e.g., signals may propagate through the system and be caused to have orthogonal modes), except with a single communication chip 608A (such as microchip 452 of FIG. 4B) transmitting the initial signals via antennas 610A and 610C and a single communication chip 608B receiving the split signals via antennas 610B and 610D.

Additionally, more chips and antennas may be included as well. Each antenna may be coupled to its own respective interface waveguide. In some examples, there may be four antennas, and four interface waveguides on each side of the waveguide system. Other possible examples are possible as well.

Many variations on the above-described implementations are possible as well, each advantageously and reliably providing communications between the vehicle and at least one sensor. In one implementation, for instance, either the vehicle side or the sensor side might not include a set of receiving chips. For example, the vehicle may include a set of chips configured to transmit signals through a waveguide system similar to that described herein for direct receipt by a radar unit (e.g., RADAR unit 126 of FIG. 1). As a result, the radar unit may receive signals with less signal loss and/or other changes than if a receiving chip had received the signals and coupled them to the radar unit.

In another implementation, a first and second waveguide section may couple to each other by a means other than a rotary joint. For example, the two waveguide sections may be coupled directly, thereby forming a singular waveguide section into and out of which signals may be coupled to and from interface waveguides. In particular, the singular waveguide may be machined from a single piece of material, or may be formed by coupling (e.g., soldering) two separate waveguide sections.

In some further examples, there may be no rotation at all, that is the two waveguides may be fixed with respect to each other. Further, the two waveguides may be a single waveguide in these examples.

Figure 7:
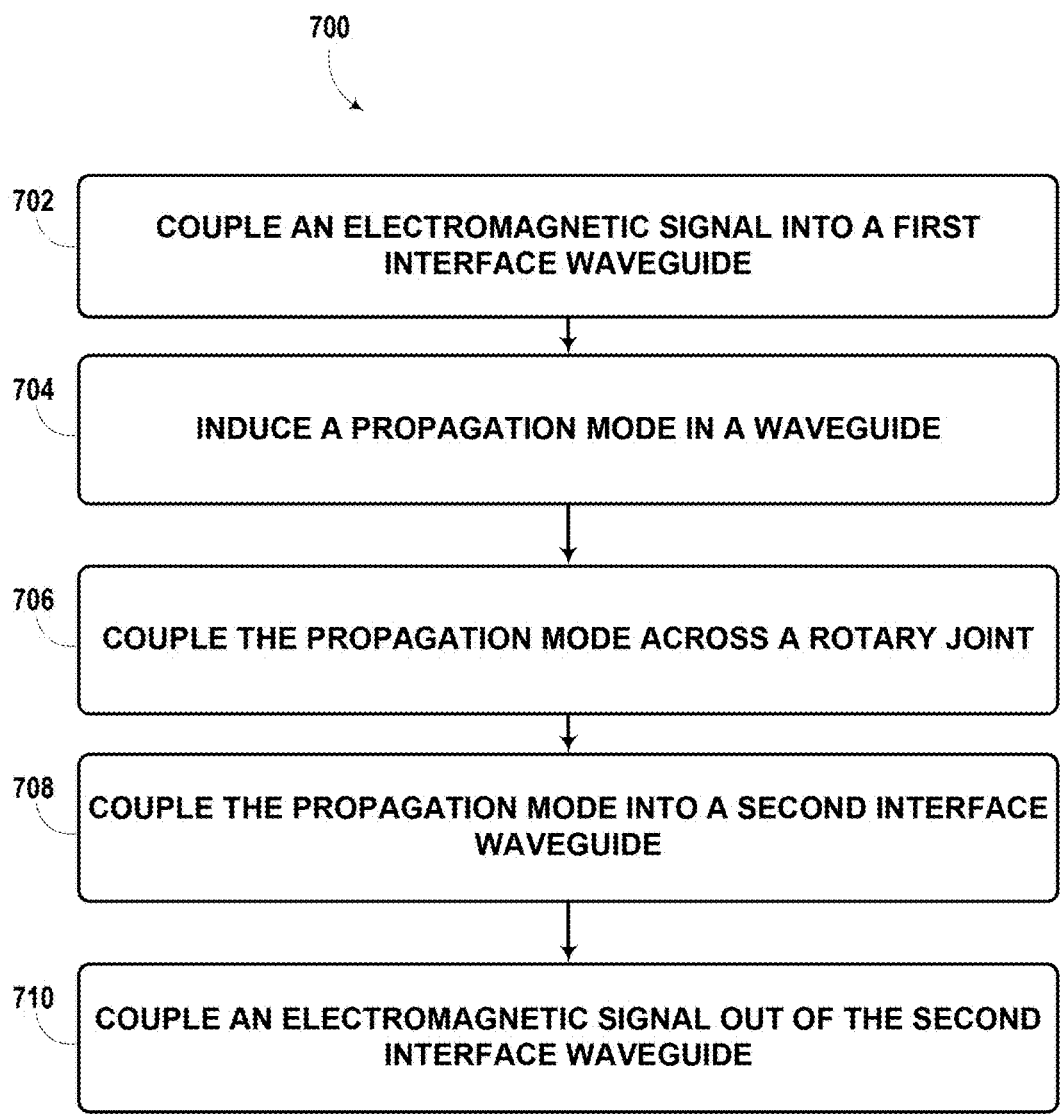
FIG. 7 illustrates an example method.

FIG. 7 illustrates an example method. At block 702, the method includes coupling an electromagnetic signal into a first interface waveguide. The first interface waveguide may be configured to be able to receive a signal that is transmitted by an antenna that is located in an antenna of a microchip. The first interface waveguide may be designed in a way to attempt to maximize the amount of energy that is transmitted by antenna that couples into the waveguide. The signal may couple into a first end of the first interface waveguide.

At block 704, the method includes inducing a propagation mode in a waveguide. The first interface waveguide may be coupled at a second end to a waveguide. The first interface waveguide may cause the signal received from the microchip to start propagating in the waveguide. The waveguide may also have a septum that is configured to cause the signal to propagate down the waveguide by having an associated propagation mode. In some examples, where there are more than one interface waveguides on each end, the septum may combine signals from each interface waveguide with each signal having a corresponding propagation mode.

For example, a signal from an interface waveguide may have a first mode induced by the septum and a signal from another interface waveguide may have a second mode induced by the septum. Because the modes may be orthogonal to each other, the original signals may be retrieved (at a later block) based on the septum dividing the signal based on modes.

At block 706, the method includes coupling the propagation mode across a rotary joint. In some examples the rotary joint may include an air gap. In other examples, the rotary joint may include a physical connection of the waveguides. At block 706, the signal propagating down a first section of a waveguide may cross the rotary joint and propagate down a second section of the waveguide. The rotary joint may allow the first section of the waveguide to rotate around a common axis with respect to the second section of the waveguide. The axis of rotation might not be perfectly in common, but may be close.

At block 708 the method includes coupling the propagation mode into a second interface waveguide. The second waveguide section may include a septum that is configured to direct a portion of the signal having a specified mode to a second interface waveguide. In some examples, where there are more than one interface waveguides on each end, the septum may split a first mode to one interface waveguide and a second mode to another interface waveguide. As previously stated, because the modes may be orthogonal to each other, the original signals may be retrieved based on the septum dividing the signal based on modes.

At block 710, the method includes coupling an electromagnetic signal out of a second interface waveguide. The second interface waveguide may be designed to maximize a percentage of the signal that radiates from the interface waveguide to be received by an antenna of a microchip.

Therefore, method 700 enables two microchips to be in radio frequency with each other even while one of the two microchips is mounted on a rotating platform. In some examples, signals might not originate or end at microchips.

Other structures may be used to launch or receive signals from the interface waveguides. For example, a radar signal generator and receiver may be coupled to one interface waveguide. On the other end may be a radar antenna. By way of the present system, the radar antenna may be on a rotating platform while maintaining communication with the radar signal generator and receiver.

In some other examples, there may be multiple interface waveguides on each end of the waveguides. In these examples, due to creating orthogonal signals, multiple signals may be communicated through the rotary joint and recovered separately after the rotary joint.

While various example aspects and example embodiments have been disclosed herein, other aspects and embodiments will be apparent to those skilled in the art. The various example aspects and example embodiments disclosed herein are for purposes of illustration and are not intended to be limiting, with the true scope and spirit being indicated by the following claims.

What is claimed is:

1. A communication system comprising:
    a rotary joint;
    a first set of one or more communication chips including a first antenna and a second antenna;
    a first electrical coupling comprising:
        a first plurality of interface waveguides including (i) a first interface waveguide configured to couple first electromagnetic signals to and from the first antenna and (ii) a second interface waveguide configured to couple second electromagnetic signals to and from the second antenna,
        a first waveguide section including:
            a first distal end bordering the rotary joint,
            a first proximal end to which the first plurality of interface waveguides are coupled, and
            a first septum configured to (i) facilitate propagation of the first and second electromagnetic signals between the rotary joint and the first plurality of interface waveguides, (ii) couple the first electromagnetic signals into the first interface waveguide such that the first electromagnetic signals are coupled having a first mode, and (iii) couple the second electromagnetic signals into the second interface waveguide such that the second electromagnetic signals are coupled having a second mode, wherein a second mode is orthogonal to the first mode;
    a second set of one or more communication chips including a third antenna and a fourth antenna; and
    a second electrical coupling comprising:
        a second plurality of interface waveguides including (i) a third interface waveguide configured to couple third electromagnetic signals to and from the third antenna and (ii) a fourth interface waveguide configured to couple fourth electromagnetic signals to and from the fourth antenna,
        a second waveguide section including:
            a second distal end bordering the rotary joint,
            a second proximal end to which the second plurality of interface waveguides are coupled, and
            a second septum configured to (i) facilitate propagation of the third and fourth electromagnetic signals between the rotary joint and the second plurality of interface waveguides, (ii) couple the third electromagnetic signals into the third interface waveguide such that the third electromagnetic signals are coupled having the first mode, and (iii) couple the fourth electromagnetic signals into the fourth interface waveguide such that the fourth electromagnetic signals are coupled having the second mode;
    wherein the rotary joint is configured to allow the first electrical coupling to rotate with respect to the second electrical coupling, wherein each electrical coupling has a respective axis of rotation, and wherein the rotary joint allows the first, second, third, and fourth electromagnetic signals to propagate between the first waveguide section and the second waveguide section.

2. The communication system of claim 1,
    wherein the first set of one or more communication chips is coupled to a sensor unit attached to a vehicle,
    wherein the second set of one or more communication chips is coupled to the vehicle at a location different from the sensor unit, and
    wherein the communication system enables two-way communication between the vehicle and the sensor unit.

3. The communication system of claim 2,
    wherein the first set of one or more communication chips are part of a light detection and ranging (LIDAR) sensor included in the sensor unit.

4. The communication system of claim 1,
    wherein one or more of (i) the first set of one or more communication chips or (ii) the second set of one or more communication chips, includes a single communication chip.

5. The communication system of claim 1,
    wherein one or more of (i) the first set of one or more communication chips or (ii) the second set of one or more communication chips, includes two communication chips.

6. The communication system of claim 1, wherein the first waveguide section and the second waveguide section are each selected from the group consisting of: a circular waveguide section and a rectangular waveguide section.

7. The communication system of claim 1, wherein the first, second, third, and fourth electromagnetic signals each have a frequency between 50 and 100 Gigahertz.

8. A vehicle comprising:
    a sensor unit comprising a first set of one or more communication chips including a first antenna and a second antenna;
    a second set of one or more communication chips disposed at a location different from the sensor unit, including a third antenna and a fourth antenna, wherein the first set of one or more communication chips and the second set of one or more communication chips are configured to engage in two-way communication with each other;
    a rotary joint;
    a first electrical coupling comprising:
        a first plurality of interface waveguides including (i) a first interface waveguide configured to couple first electromagnetic signals to and from the first antenna and (ii) a second interface waveguide configured to couple second electromagnetic signals to and from the second antenna,
        a first waveguide section including:
            a first distal end bordering the rotary joint,
            a first proximal end to which the first plurality of interface waveguides are coupled, and
            a first septum configured to (i) facilitate propagation of the first and second electromagnetic signals between the rotary joint and the first plurality of interface waveguides, (ii) couple the first electromagnetic signals into the first interface waveguide such that the first electromagnetic signals are coupled having a first mode, and (iii) couple the second electromagnetic signals into the second interface waveguide such that the second electromagnetic signals are coupled having a second mode, wherein a second mode is orthogonal to the first mode;

a second electrical coupling, comprising:
a second plurality of interface waveguides including (i) a third interface waveguide configured to couple third electromagnetic signals to and from the third antenna and (ii) a fourth interface waveguide configured to couple fourth electromagnetic signals to and from the fourth antenna,
a second waveguide section including:
a second distal end bordering the rotary joint,
a second proximal end to which the second plurality of interface waveguides are coupled, and
a second septum configured to (i) facilitate propagation of the third and fourth electromagnetic signals between the rotary joint and the second plurality of interface waveguides, (ii) couple the third electromagnetic signals into the third interface waveguide such that the third electromagnetic signals are coupled having the first mode, and (iii) couple the fourth electromagnetic signals into the fourth interface waveguide such that the fourth electromagnetic signals are coupled having the second mode;

wherein the rotary joint is configured to allow the first electrical coupling to rotate with respect to the second electrical coupling, wherein each electrical coupling has a respective axis of rotation, and wherein the rotary joint allows the first, second, third, and fourth electromagnetic signals to propagate between the first waveguide section and the second waveguide section.

9. The vehicle of claim 8, wherein one or more of (i) the first set of one or more communication chips or (ii) the second set of one or more communication chips, includes two communication chips.

10. The vehicle of claim 8,
wherein the first set of one or more communication chips are part of a light detection and ranging (LIDAR) sensor included in the sensor unit.

11. The vehicle of claim 8, wherein one or more of (i) the first set of one or more communication chips or (ii) the second set of one or more communication chips, includes a single communication chip.

12. A method comprising:
transmitting, by a first antenna of a first set of one or more communication chips, into a first interface waveguide of a first plurality of waveguides of a first electrical coupling, first electromagnetic signals;
transmitting, by a second antenna of the first set of one or more communication chips, into a second interface waveguide of the first plurality of waveguides of the first electrical coupling, second electromagnetic signals;
coupling, by the first plurality of waveguides, the first and second electromagnetic signals into a first waveguide section, wherein the first waveguide section includes a first distal end bordering a rotary joint, a first proximal end to which the first plurality of interface waveguides are coupled, and a first septum;

facilitating, by the first septum, propagation of the first and second electromagnetic signals from the first plurality of interface waveguides to the rotary joint;
coupling the first and second electromagnetic signals from the first waveguide section to a second waveguide section by way of the rotary joint, wherein the second waveguide section is part of a second electrical coupling and includes a second distal end bordering the rotary joint, a second proximal end to which a second plurality of interface waveguides are coupled, and a second septum;
facilitating, by the second septum, to the second plurality of interface waveguides, propagation of the first and second electromagnetic signals received from the first waveguide section, wherein propagating the first and second electromagnetic signals to the second plurality of interface waveguides comprises (i) coupling a first subset of the first and second electromagnetic signals into a third interface waveguide of the second plurality of interface waveguides such that the first subset of the first and second electromagnetic signals is coupled having a first mode and (ii) coupling a second subset of the first and second electromagnetic signals into a fourth interface waveguide of the second plurality of interface waveguides such that the second subset of the first and second electromagnetic signals is coupled having a second mode that is orthogonal to the first mode;
coupling, by the second plurality of waveguides, the first and second subsets of the first and second electromagnetic signals to a third antenna of a second set of one or more communication chips and a fourth antenna of the second set of one or more communication chips;
receiving, by the third antenna, from the third interface waveguide, the first subset of the first and second electromagnetic signals; and
receiving, by the fourth antenna, from the fourth interface waveguide, the second subset of the first and second electromagnetic signals,
wherein the rotary joint is configured to allow the first electrical coupling to rotate with respect to the second electrical coupling, wherein each electrical coupling has a respective axis of rotation.

13. The method of claim 12,
wherein one or more of (i) the first set of one or more communication chips or (ii) the second set of one or more communication chips, includes a single communication chip.

14. The method of claim 12,
wherein one or more of (i) the first set of one or more communication chips or (ii) the second set of one or more communication chips, includes two communication chips.

15. The method of claim 12,
wherein communication between the first set of one or more communication chips and the second set of one or more communication chips is two-way communication such that the second set of one or more communication chips is configured to transmit electromagnetic signals for receipt by the first set of one or more communication chips via the first and second electrical couplings and the rotary joint.

16. The method of claim 12,
wherein the first set of one or more communication chips is coupled to a sensor unit attached to a vehicle, wherein the second set of one or more communication chips is coupled to the vehicle at a location different from the sensor unit, and wherein the communication system enables two-way communication between the vehicle and the sensor unit.

17. The method of claim 16, wherein the first set of one or more communication chips are part of a light detection and ranging (LIDAR) sensor included in the sensor unit.

18. The method of claim 12, wherein the first and second electromagnetic signals each have a frequency between 50 and 100 Gigahertz.

* * * * *